3,652,754
BENZODIAZEPINE DERIVATIVES
Kanji Meguro, Nishinomiya, Yutaka Kuwada, Ashiya, Yuji Nagawa, Otokunigun, and Toru Masuda, Nishinomiya, Japan, assignors to Takeda Chemical Industries, Ltd., Osaka, Japan
No Drawing. Filed Aug. 22, 1969, Ser. No. 852,471
Claims priority, application Japan, Aug. 26, 1968, 43/61,070
Int. Cl. A61k 27/00; C07d 53/06
U.S. Cl. 260—239 BD          18 Claims

ABSTRACT OF THE DISCLOSURE

Benzodiazepine derivatives of the formula

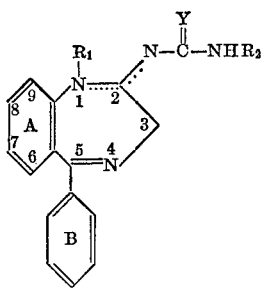

wherein $R_1$ is hydrogen or alkyl, $R_2$ is a hydrocarbon group, Y is oxygen or sulfur atom and the respective benzene rings A and B may have one or more substituents from the group of nitro, trifluoromethyl, halogen, alkyl and alkoxy, and their 4 N-oxides, and pharmaceutically acceptable salts thereof, are useful tranquilizing, muscle relaxant and anticonvulsant agents.

This invention relates to novel and useful benzodiazepine derivatives of the general formula:

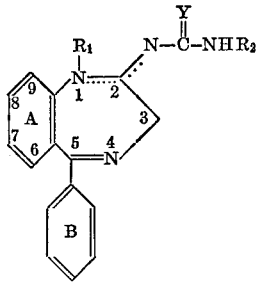

(I)

wherein $R_1$ is hydrogen or alkyl, $R_2$ is a hydrocarbon group, Y is oxygen or sulfur atom and the respective benzene rings A and B may have one or more substituents from the group of nitro, trifluoromethyl, halogen, alkyl and alkoxy, and their 4 N-oxides.

Regarding the above general Formula I, when the symbol $R_1$ represents an alkyl group, the compounds of the present invention are of the general formula

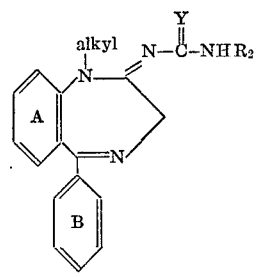

(I')

and when the symbol $R_1$ represents hydrogen, they are of the general formula

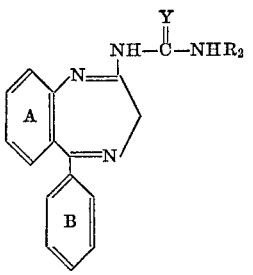

(I'')

The compounds (I'') may also be represented in their isomeric configuration by the general formula

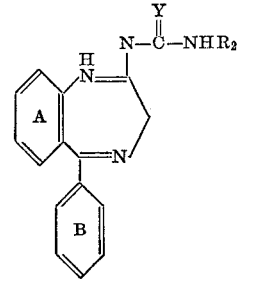

(I''')

In the specification and claims the symbols ". . . . . ." appearing in the general formulae are used to designate the above indicated variation in structural formula. Hereinafter, the compounds of the Formula I are simply referred to as "benzodiazepine derivatives (I)."

The novel benzodiazepine derivatives (I) show muscle relaxant, anticonvulsant, sedative and taming effect and therefore they can be used as tranquilizing, muscle relaxant and anticonvulsant agents, etc.

Referring to the aforementioned Formula I, among the alkyl groups represented by $R_1$, lower alkyls and cycloalkyls having up to 6 carbon atoms are preferable. These are exemplified by methyl, ethyl, propyl, isopropyl, butyl, sec-butyl, tert-butyl, amyl, hexyl, cyclopentyl, cyclohexyl, etc. Among the lower alkyls, methyl and ethyl groups are most preferable. The respective benzene rings A and B can have one or more substituents, being the same or different, from the group of nitro, trifluoromethyl, halogen, (chlorine, bromine, fluorine, iodine), alkyl, such as lower alkyl (e.g. methyl, ethyl, n-propyl, iso-propyl, butyl, sec-butyl, etc.) or alkoxy, such as lower alkoxy (e.g. methoxy, ethoxy, propoxy, butoxy, etc.). The hydrocarbon group represented by $R_2$ includes alkyl, aralkyl and aryl groups, etc. Among the alkyls represented by $R_2$, lower alkyls and cycloalkyls having up to 6 carbon atoms are preferable, which may be exemplified by methyl, ethyl, propyl, isopropyl, butyl, sec-butyl, tert-butyl, pentyl, hexyl, cyclopentyl, cyclohexyl, etc. The aralkyl represented by $R_2$ is exemplified by phenyl lower alkyl, such as benzyl, phenethyl, etc. The aryl represented by $R_2$ is exemplified by phenyl, naphthyl, etc. The above mentioned aralkyl and aryl groups may themselves have at any optional positions, one or more substituents which are illustrated by halogen (e.g. chlorine, bromine, etc.), alkyl such as lower alkyl (e.g. methyl, ethyl, propyl, butyl, etc.), alkoxy such as lower alkoxy (e.g. methoxy, ethoxy, propoxy, butoxy, etc.), nitro, acyl, lower alkane monocarboxylic acid acyl and aryl monocarboxylic acid acyl (e.g. acetyl, benzoyl, etc.). The benzene rings A and B respectively can have one or more substituents from among nitro, trifluoromethyl, halogen (e.g. chlorine, bromine, etc.), alkyl such as lower alkyl (e.g. methyl, ethyl, propyl, etc.), and alkoxy such as lower alkoxy (e.g. methoxy, ethoxy, etc.).

The 4 N-oxides of the compounds (I), i.e. the compounds of the general formula

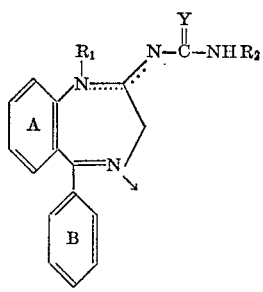

also fall within the scope of the present invention.

The benzodiazepine derivatives (I) or their 4 N-oxides of the present invention can be prepared by allowing 2-aminobenzodiazepine derivatives of the general formula

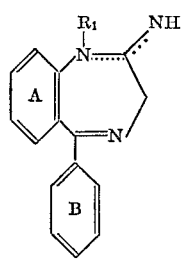

(II)

(wherein $R_1$ has the same meaning as defined above and the respective benzene rings A and B may have the same substituent(s) as defined above) or their 4 N-oxides to react with a compound of the general formula $R_2$—NCY   (III)

(wherein $R_2$ and Y have the same meanings as defined above).

The starting 2-aminobenzodiazepine derivatives (II) and their 4 N-oxides can be prepared, for example, through the steps as shown in the following equations:

(A)

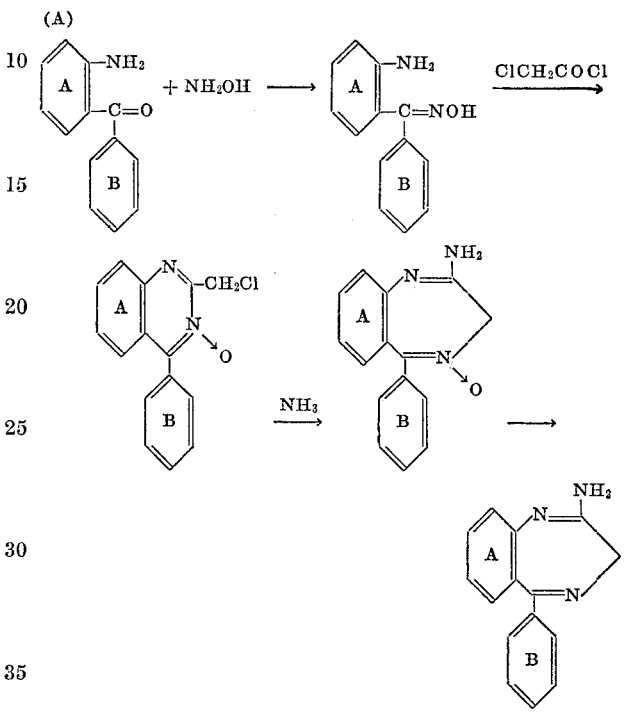

(see, for example, L. H. Sternbach, E. Reeder. J. Organic Chemistry, 26, 1111 (1961))

(B)

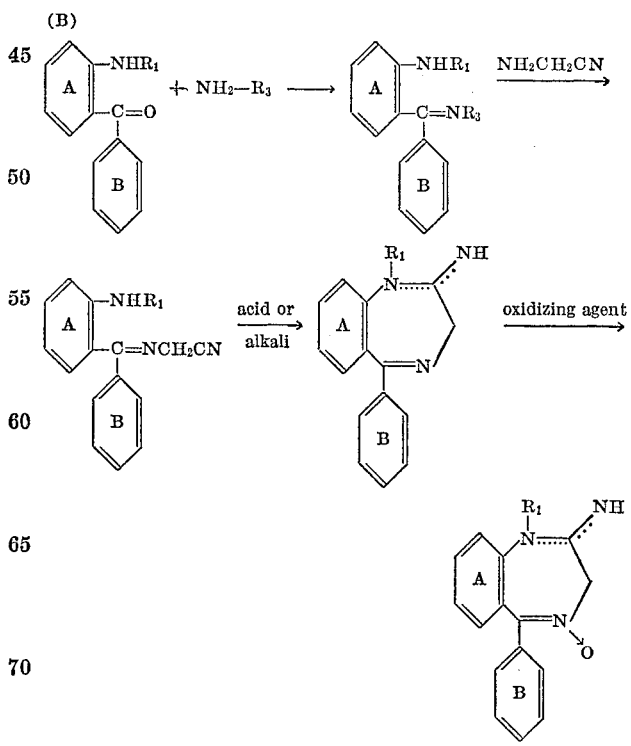

($R_3$ is, for example, hydrogen or alkyl).

Regarding the above general Formula II, when $R_1$ is alkyl, the compound corresponds to the following general formula

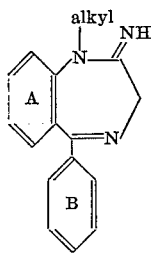

and when $R_1$ is hydrogen, it corresponds to the following formula

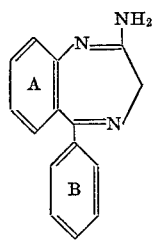

and may also have the following isomeric formula:

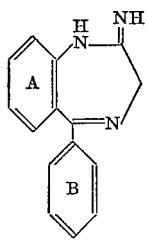

The reaction is preferably carried out in the presence of a solvent. The solvent may be, for example, aromatic hydrocarbon (e.g. benzene, toluene, etc.), tetrahydrofuran, etc. The reaction proceeds generally at room temperature, but if required, may be conducted at any higher or lower temperature. Amount of the compounds (III) to be employed is generally not less than one mole, practically about one mole to two moles per mole of the 2-aminobenzodiazepine derivatives (II) or their 4 N-oxides.

The benzodiazepine derivatives (I) or their 4 N-oxides thus produced can be isolated in the form of free bases or suitable acid salts (e.g. hydrochloride, sulfate, acetate, etc.) by per se conventional means, for example, by distilling the solvent from the reaction mixture. For purposes of this invention the acid salts are considered to be the equivalent of the free bases.

The benzodiazepine derivatives (I) and their 4 N-oxides as well as their acid salts are orally or parenterally administrable per se or in a suitable form such as powders, granules, tablets or injection solutions admixed with a pharmaceutically acceptable carrier or adjuvant. The dose of the benzodiazepine deriatives (I), their 4 N-oxides or their acid salts to be administered varies depending on the kinds of the benzodiazepine derivatives (I), severity of the disease, etc., and generally falls within a range of about 1 to about 30 milligrams upon oral administration, and about 0.5 to about 10 milligrams upon parenteral administration for human adult per day.

For further detailed explanation of the invention, the following examples are given, wherein the term "part(s)" means "weight part(s)" unless otherwise specified, and the relationship between "part(s)" and "part(s) by volume" corresponds to that between gram(s) and milliliter(s).

EXAMPLE 1

To a solution of 1.35 parts of 2-amino-7-chloro-5-phenyl-3H-1,4-benzodiazepine in 30 parts by volume of tetrahydrofuran is added 0.6 part by volume of methyl isocyanate. The mixture is kept standing at room temperature for 2 hours, followed by distillation of the solvent. The residue is recrystallized from ethanol to yield 7-chloro-2-(N-methylcarbamoyl)amino - 5 - phenyl-3H-1,4-benzodiazepine as colorless needles melting at 209° C. to 210° C. (decomp.).

Elementary analysis.—Calculated for $C_{17}H_{15}ClN_4O$ (percent): C, 62.48; H, 4.63; N, 17.15. Found (percent): C, 62.80; H, 4.50; N, 17.42.

EXAMPLE 2

A solution of 1.4 parts of 2-amino-7-nitro-5-phenyl-3H-1,4-benzodiazepin and 1.5 parts of methyl isothiocyanate in 20 parts by volume of tetrahydrofuran is refluxed for 30 hours, followed by distillation of the solvent. The residue is recrystallized from ethanol to yield 2-(N - methylthiocarbamoyl)amino-7-nitro-5-phenyl-3H-1,4-benzodiazepine as pale yellow fine needles melting at 191° C. to 192° C. (decomp.).

Elementary analysis.—Calculated for $C_{17}H_{15}N_5O_2S$ (percent): C, 57.77; H, 4.28; N, 19.82. Found (percent): C, 57.89; H, 3.96; N, 19.57.

EXAMPLE 3

A mixture of 8.6 parts of 2-amino-7-chloro-5-phenyl-3H-1,4-benzodiazepine 4 N-oxide, 3 parts by volume of methyl isocyanate and 500 parts by volume of tetrahydrofuran are refluxed for 1.5 hours. The solvent is evaporated and the residue is recrystallized from dimethylformamide-water to give 7-chloro-2-(N-methylcarbamoyl)amino-5-phenyl-3H-1,4-benzodiazepine 4 N-oxide as colorless prisms melting at 225° C. to 227° C. (decomp.).

Elementary analysis.—Calculated for $C_{17}H_{15}ClN_4O_2$ (percent): C, 59.56; H, 4.41; N, 16.35. Found (percent): C, 59.46; H, 4.23; N, 16.23.

EXAMPLE 4

To a solution of 1 part of 2-amino-7-chloro-5-(p-methoxyphenyl)-3H-1,4-benzodiazepine in 40 parts by volume of tetrahydrofuran are added 1.18 parts by volume of methyl isocyanate and the mixture is kept standing at room temperature for 1 hour. The solvent is evaporated and the residue is recrystallized from methanol to yield 7-chloro-5-(p-methoxyphenyl)-2-(N-methylcarbamoyl)-amino-3H-1,4-benzodiazepine as colorless needles. Melting point: 210–211° C.

Elementary analysis.—Calculated for $C_{18}H_{17}ClN_4O_2$ (percent): C, 60.59; H, 4.80; N, 15.70. Found (percent): C, 60.56; H, 4.76; N, 15.59.

In a similar manner to the processes of the above examples, the compounds of the present invention are prepared as listed in the following table.

TABLE

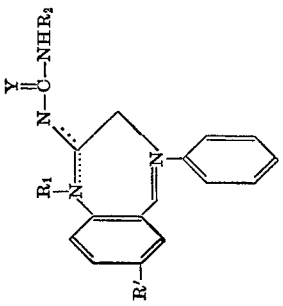

| R' | R₁ | R₂ | Y | Solvent of recrystallization | | Melting point, °C. | Formula | Calculated, percent | | | Found, percent | | |
|---|---|---|---|---|---|---|---|---|---|---|---|---|---|
| | | | | | | | | C | H | N | C | H | N |
| H | H | CH₃ | O | Benzene-n-hexane | Colorless needles | 198–194 | C₁₇H₁₆N₄O | 69.84 | 5.52 | 19.17 | 69.61 | 5.62 | 19.01 |
| NO₂ | H | CH₃ | O | Dimethylformamide-H₂O | Pale yellow prisms | 214–215 | C₁₇H₁₅N₅O₃ | 60.53 | 4.48 | 20.76 | 60.46 | 4.15 | 20.51 |
| Cl | CH₃ | CH₃ | O | Methanolisopropylether | Colorless needles | 167–169 | C₁₈H₁₇ClN₄O | 63.43 | 5.03 | 16.44 | 63.17 | 5.27 | 16.29 |
| NO₂ | H | C₆H₅ | O | Dimethylformamide-H₂O | Colorless prisms | 228–229 | C₂₂H₁₇ClN₄O | 67.95 | 4.41 | 14.41 | 67.73 | 4.61 | 14.44 |
| Cl | H | CH₃ | O | do | Yellow prisms | 230–231 | C₂₂H₁₇N₅O₃ | 66.15 | 4.29 | 17.54 | 66.25 | 4.37 | 17.66 |
| Cl | H | CH₃ | S | do | Colorless needles | 1 211–212 | C₁₇H₁₅ClN₄S | 59.55 | 4.41 | 16.31 | 59.52 | 4.34 | 16.43 |
| Cl | H | p-ClC₆H₄ | O | do | Colorless prisms | 1 230–232 | C₂₂H₁₆Cl₂N₄O | 62.42 | 3.81 | 13.24 | 62.58 | 3.67 | 13.34 |
| CH₃O | H | CH₃ | O | do | Pale yellow prisms | 197–199 | C₁₈H₁₈N₄O₂ | 67.07 | 5.63 | 17.88 | 67.08 | 5.75 | 17.16 |
| CH₃ | H | CH₃ | O | Ethanol | do | 1 212–213 | C₁₈H₁₈N₄O | 70.56 | 5.92 | 18.29 | 70.55 | 6.09 | 18.38 |
| CF₃ | H | CH₃ | O | Methanol | Pale yellow prisms | 207–210 | C₁₈H₁₅F₃N₄O | 59.99 | 4.20 | 15.55 | 59.82 | 4.19 | 15.31 |
| Cl | H | C₂H₅ | O | Dimethylformamide-H₂O | Colorless needles | 1 212–213 | C₁₈H₁₇ClN₄O | 63.43 | 5.03 | 16.44 | 63.54 | 4.97 | 16.61 |
| Cl | H | C₆H₅CH₂ | O | Acetone | Colorless needles | 1 186–188 | C₂₃H₁₉ClN₄O | 68.57 | 4.75 | 13.91 | 68.84 | 4.80 | 14.19 |

¹ Dec.

What is claimed is:

1. A member selected from the group of (a) a benzodiazepine derivative of the formula

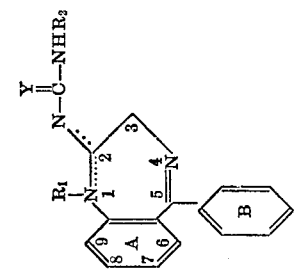

alkane monocarboxylic acid acyl, and benzoyl, Y represents oxygen or sulfur and the benzene rings A and B respectively may have one or more substituents selected from the group consisting of nitro, trifluoromethyl, halogen, lower alkyl and lower alkoxy, (b) N-oxides thereof and (c) pharmaceutically acceptable acid salts thereof.

2. A pharmaceutically acceptable acid salt of a benzodiazepine derivative or 4 N-oxide thereof as defined in claim 1.

3. A benzodiazepine derivative as in claim 1 wherein R₁ is hydrogen or methyl.

4. A benzodiazepine derivative as in claim 1 wherein R₂ is methyl, ethyl, phenyl, halogeno phenyl or benzyl.

5. A compound as in claim 1, said compound being 7-chloro-2-(N - methylcarbamoyl)amino-5-phenyl-3H-1,4-benzodiazepine.

6. A compound as in claim 1, said compound being 2-(N-methylthiocarbamoyl)amino - 7 - nitro-5-phenyl-3H-1,4-benzodiazepine.

7. A compound as in claim 1, said compound being 2-(N - methylcarbamoyl)-amino-7-nitro-5-phenyl-3H-1,4-benzodiazepine.

8. A compound as in claim 1, said compound being wherein R₁ represents hydrogen, lower alkyl or cycloalkyl of up to 6 carbon atoms, R₂ represents lower alkyl, cycloalkyl of up to 6 carbon atoms, phenyl, naphthyl, phenyl lower alkyl or substituted phenyl, naphthyl or phenyl lower alkyl wherein the substituents are one or more from the group of halogen, lower alkyl, lower alkoxy, nitro, lower 2-(N-methylcarbamoyl)amino - 5 - phenyl-3H-1,4-benzodiazepine.

9. A compound as in claim 1, said compound being 7-chloro - 1 - methyl - 2 - (N - methylcarbamoyl)imino-5-phenyl-2,3-dihydro-1H-1,4-benzodiazepine.

10. A compound as in claim 1, said compound being 7-chloro-2-(N - phenylcarbamoyl)amino-5-phenyl-3H-1,4-benzodiazepine.

11. A compound as in claim 1, said compound being 7-nitro-2-(N-phenylcarbamoyl)amino - 5 - phenyl-3H-1,4-benzodiazepine.

12. A compound as in claim 1, said compound being 7-chloro-2-(N - methylthiocarbamoyl)amino-5-phenyl-3H-1,4-benzodiazepine.

13. A compound as in claim 1, said compound being 2 - [N - (p - chlorophenyl)carbamoyl]amino-7-chloro-5-phenyl-3H-1,4-benzodiazepine.

14. A compound as in claim 1, said compound being 7-methoxy - 2 - (N-methylcarbamoyl)amino-5-phenyl-3H-1,4-benzodiazepine.

15. A compound as in claim 1, said compound being 7-methyl - 2 - (N - methylcarbamoyl)amino-5-phenyl-3H-1,4-benzodiazepine.

16. A compound as in claim 1, said compound being 2-(N-methylcarbamoyl)amino - 5 - phenyl - 7 - trifluoromethyl-3H-1,4-benzodiazepine.

17. A compound as in claim 1, said compound being 7-chloro-2(N-ethylcarbamoyl)amino - 5 - phenyl-3H-1,4-benzodiazepine.

18. A compound as in claim 1, said compound being 2-(N - benzylcarbamoyl)amino-7-chloro-5-phenyl-3H-1,4-benzodiazepine.

References Cited

UNITED STATES PATENTS 3,422,091  1/1969  Archer et al. _____ 260—239

ALTON D. ROLLINS, Primary Examiner

U.S. Cl. X.R.

424—244